April 2, 1968     F. W. WAGNER     3,376,407
ELECTRIC HEATING UNIT FOR INSERTION INTO HOLLOW
BODIES, ESPECIALLY CALENDER ROLLERS
Filed July 16, 1965     2 Sheets-Sheet 1
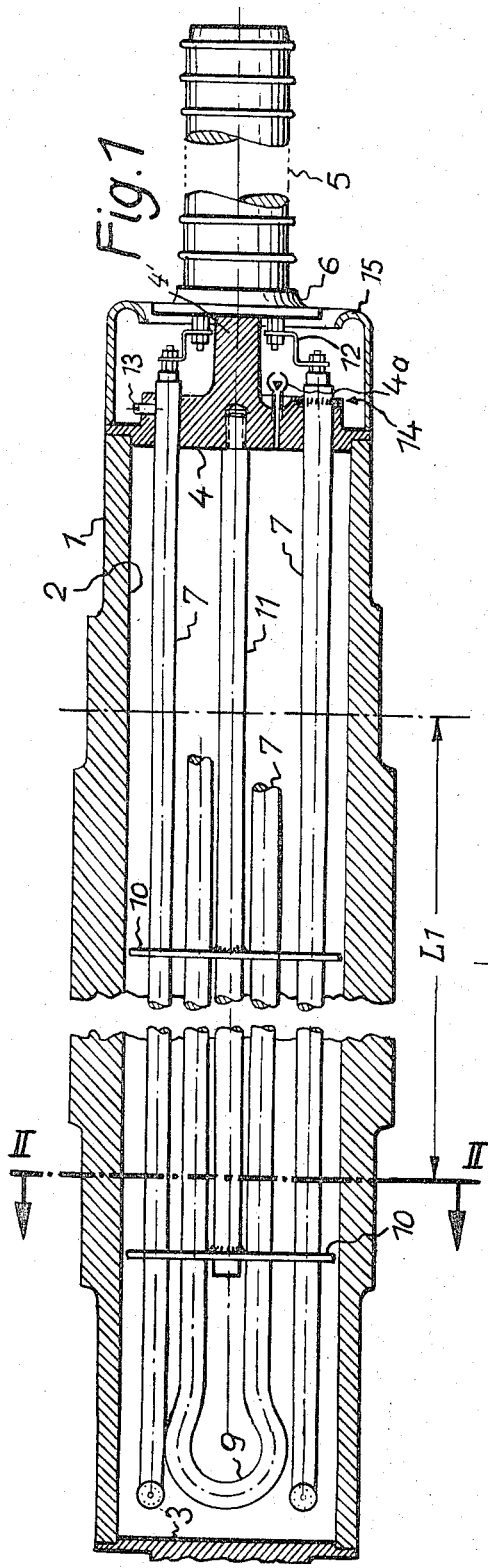
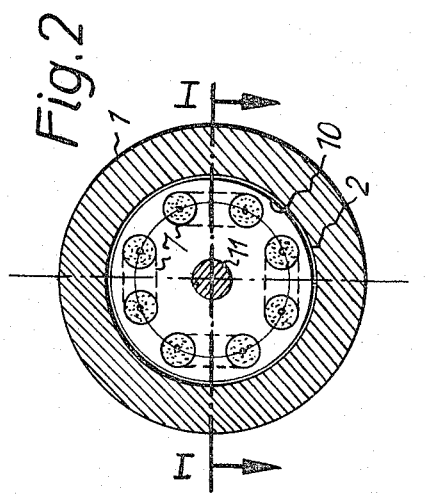
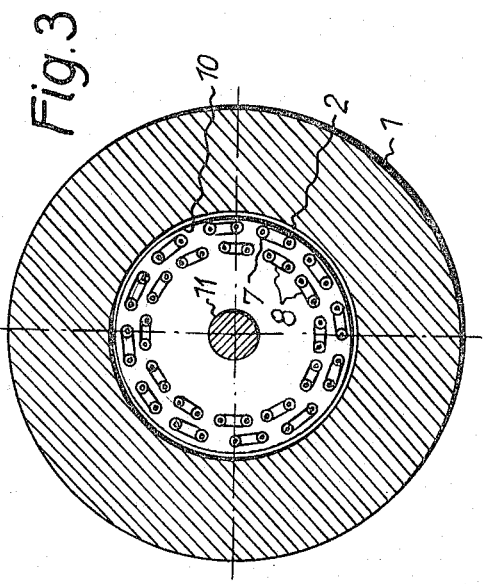

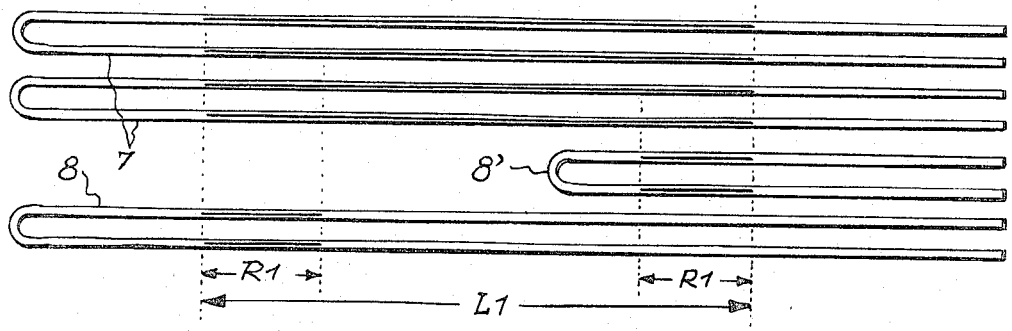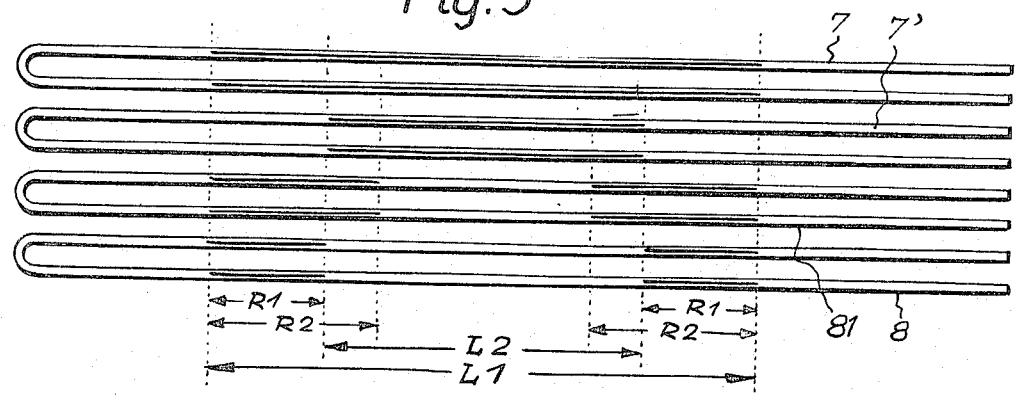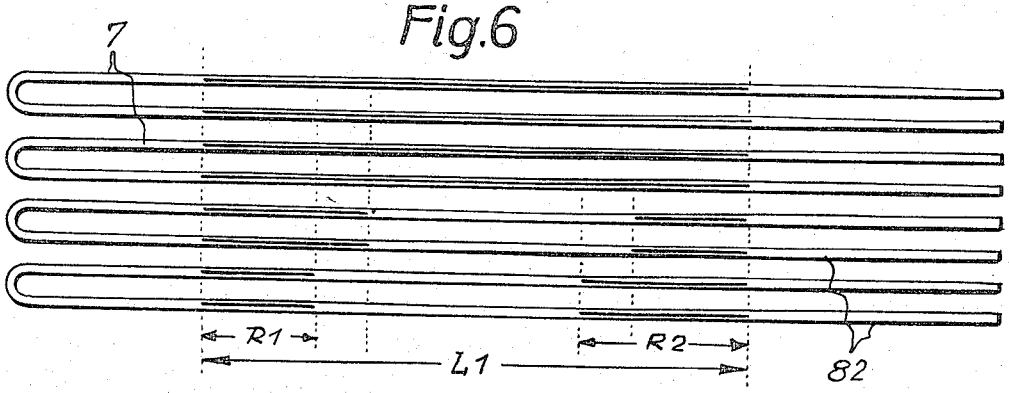

United States Patent Office 3,376,407
Patented Apr. 2, 1968

3,376,407
ELECTRIC HEATING UNIT FOR INSERTION INTO HOLLOW BODIES, ESPECIALLY CALENDER ROLLERS
Fritz W. Wagner, Krefeld, Germany, assignor to Joh. Kleinewefers Sohne, Krefeld, Germany
Filed July 16, 1965, Ser. No. 472,535
Claims priority, application Germany, July 18, 1964, K 53,509
5 Claims. (Cl. 219—470)

ABSTRACT OF THE DISCLOSURE

The present invention relates to a heat register for insertion into a hollow calender roll having an open end. The invention is characteried primarily in the provision of two groups of tubular heating rods supported by the said closure member along two complete concentric lines and extending at one side of the closure member while terminal means respectively connected to said tubular heating rods are arranged on the other side of said closure member and are connected to collector means supported by said closure member.

---

The present invention relates to electric heating inserts composed of tubular heating bodies (backer rods) for the heating of hollow bodies, especially calender rollers.

Heating inserts of the above mentioned type are generally so designed that they rotate together with the calender roller, and the supply of current is effected through a collecting ring. With such an arrangement, in the interior of the hollow body or roller there is provided a supporting frame on which the individual heating rods are arranged on a single cylinder surface near the wall of the bore in order to take advantage as far as possible of the radiation energy.

These heating inserts, however, have the drawback that not sufficient heat output can be mounted because the marginal heating bars which are required only for the heating of the roller ends which are strongly heat conducting, take space away for the main heating elements passing through the roller. In view of the necessary switching or control possibilities and in order to assure a distribution of the heating energy of the marginal heating bodies as uniform as possible, the marginal heating rods make up a third or more of the total number of heating rods so that the total heating output of the main heating rods is reduced by a corresponding percentage.

A further drawback of the above outlined heretofore known arrangements consists in that the tubular heating bodies are wired at both ends in the interior of the calender roller and that from the terminals, pearl-isolated (perlenisolierte) feeding lines lead to the collector ring body. In view of the heat effect, it is also necessary to hard solder the connections. Furthermore, the continuous change from cold to warm roller brings about a deposit of condensing water which at the current feed line connections and pearl insulations form current bridges which, over a certain period of time, destroy the supply lines.

It is, therefore, an object of the present invention to provide an electric heating insert for hollow bodies, especially calender rollers, which will overcome the above mentioned drawbacks.

It is another object of this invention to provide an electric heating unit for insertion into hollow bodies, especially calender rollers, which will permit a considerable increase in the specific load of the heating unit.

It is still another object of this invention to provide an arrangement as set forth in the preceding paragraphs which will increase the safety of operation and will reduce the costs of assembly.

These and other objects and advantages of the invention will appear more clearly from the following specification in connection with the accompanying drawings, in which:

FIG. 1 is a longitudinal section along the line I—I of FIG. 2 through a heating insert according to the present invention which comprises four hairpin-shaped heating bars, in which for the sake of clarity the heating bars arranged along an inner concentric cylindrical surface have been omitted.

FIG. 2 is a section along the line II—II of FIG. 1.

FIG. 3 illustrates a cross section through a heating insert according to the present invention with hairpin-shaped tubular heating bodies arranged along two coaxial cylindrical surfaces.

FIG. 4 diagrammatically indicates one possibility of arranging the heating bars and shows half the number of heating bars designed as main heating bars and the other half designed as marginal or end heating bars.

FIG. 5 shows a different arrangement of the heating bars according to which the main heating bars are of two different lengths and also the marginal heating bars are of two different lengths to accommodate goods of greatly varying width to be passed over the calender.

FIG. 6 shows still another possibility of arranging and selecting the heating bars, according to which the marginal heating bars at one side have a different length from the marginal heating bars on the other side and may selectively be heated together or to a different extent.

FIG. 7 is a sectional view of a heating bar with an increasingly stretched winding.

The present invention is characterized primarily in that the tubular heating bodies for the main heating elements and the marginal heating bodies for heating marginal or end portions of the calendar are located along two separate coaxially arranged cylindrical surfaces, while the main heating bars are advantageously arranged along the outer cylindrical surface.

According to a further development of the present invention, hairpin-shaped tubular bodies are employed which have a heating coil in that area only where heat emanation or radiation is required, the non-heated extensions or connections are extended so that the same can be passed through a corresponding closure member toward the outside where the collecting ring body is provided.

Referring now to the drawing in detail, the arrangement shown therein comprises a calendar roller 1 having a heating bore 2 which is closed at one end by a cover 3 and at the other end by a cover 4. Cover 4 comprises a stud 4' carrying a collector ring body 5 for electric connection with the tubular heating bodies 7. Also connected to cover 4 is, preferably, a central supporting bar 11 having mounted thereon in axially spaced arrangement of said bar 11 a plurality of supporting discs 10 with peripheral bores. Heating bars or rods 7, which are hairpin-shaped, have at the looped end 9 a somewhat greater radius of curvature than the distance between the two legs of the respective hairpin-shaped bar. These heating bars 7 have a heating coil solely within the range of the length L1, whereas in the remaining parts, the heating wire is straight or provided with a reinforcement and does not furnish any material heat output.

The non-heated connecting ends of heating bars 7 are passed through corresponding bores of cover 4 toward the outside and may be connected to cover 4 either by set screws 13 as shown in the upper portion of FIG. 1 or may be hard soldered as indicated at 14 in the lower portion of FIG. 1 so as to be pressure and air-tight.

From the threaded ends of the said connections, wires 12 lead to the connections or terminals of the collecting ring body 5. A pressure-tight soldering of the connecting ends has the great advantage that the heat inserts can be made airtight. In cover 4 there may be provided a relief valve 4a for the escape of expanded hot air (see FIG. 7). The vacuum not only prevents the accumulation of humidity and thus the formation of rust which inhibits the life of the tubular bodies but also improves the degree of efficiency of the infrared radiation of the tubular heating bodies toward the wall of the bore.

The wiring of the heating insert at the cover 4 is protected by a protective cap 15 in a contact-proof manner. The protective cap is, for instance, by means of springs 16 secured on the first correspondingly designed insulating disc of the collector ring body 5.

The arrangement of the heating bars along two cylindrical surfaces is illustrated in FIG. 3 according to which twelve hairpin bars with twenty-four longitudinal heating bars 7 are arranged along the outer cylindrical surface and the same number of marginal heating bars 8 is arranged along the inner cylindrical surface. The influence of the mutual radiation of the longitudinal or main heating bars and marginal heating bars is taken into consideration by a corresponding dimensioning of the heating bars due to the fact that, in this way, sufficient main heating bars can be mounted, the electric load can be reduced by a small amount so that the temperature increase in the marginal zones as brought about by the radiation of the marginal heating bodies cannot have any harmful effect. The marginal heating bars will be effective due to the fact that a portion of the rays between the main heating bars will pass directly to the wall of the bore and another portion will bring about an increase in the temperature of the main heating bars in said range.

FIGS. 4 to 6 show different possibilities of arranging the heating bars, while, advantageously, so many main heating bars are provided that the number thereof in view of the required switch possibilities in groups and in view of the required connection to a 3-phase network should be divisible by three and possibly also by two. With the considerably shorter marginal heating bars it will be necessary, however, that all bars of a group may be connected to a phase in series. FIGS. 4 and 5 are to be so interpreted that a multiple of the illustrated bars will compose the complete heating insert.

FIG. 4 shows that it is now possible to provide as many marginal heating bars as there are longitudinal heating bars 7. Moreover, with this arrangement, the left-hand marginal heating group with heating bars 8 and the right-hand heating group with marginal bars 8' may be made effective separately so that the marginal areas R1 can be heated to a different extent. Heretofore, great difficulties were encountered in this respect because the length of the marginal heating zones at both ends of the calendar roller could never be precisely calculated in advance. For purposes of saving material, the marginal heating bars 8' which heat the roller end at the connecting side are correspondingly shorter.

FIG. 5 shows a heating insert in which the longitudinal or main heating zone is equipped with two groups of the same size as long heating bars 7 and 7' for two different heating zones L1 and L2. The somewhat shorter heating group 7' is employed when calendering very narrow goods, in which instance, of the marginal heating bars 8 and 81 which are likewise arranged in two groups, the shorter heating group 8 of the length R1 is separately employed.

FIG. 6 shows a heating insert in which the marginal heating bars 82 with differently long marginal heating zones R1 and R2 are employed while the marginal heating zones R1 and R2 at one roller end alternate. In order to permit a gradual merging of the unheated with the heated zones, the heating coils are so designed that they merge with increasingly stretched windings with the non-heated conductor portions (see FIG. 8).

As will be evident from the above, the arrangement of the heating bodies along two cylindrical surfaces makes possible to equip the outer cylindrical surface with continuous longitudinal or main heating bars. Along the inner cylindrical surface there is now available a considerably greater number of marginal heating bars so that the possibility is obtained for the arrangement of even two differently long marginal heating zones.

The design of the heating bodies in the form of hairpins has the advantage that in the interior of the calender bore there will no longer be located any switch areas and there will be no points of attack for corrosion or crawling strokes by a deposit of humidity. A further important advantage of the hairpin shape consists in that due to the soldering of the heating bars in the cover, air-tightly closed heating inserts with vacuum can be provided for.

It is, of course, to be understood that the present invention is, by no means, limited to the particular arrangement shown in the drawings but also comprises any modification within the scope of the appended claims.

What I claim is:

1. A heating register for insertion into a hollow calender roll having an open end, which comprises: a closure member detachably connectable to said open end of said calender roll for rotation therewith and closing said open end, a first group of tubular heating rods supported by said closure member along a first complete circle and extending from said closure member at one side thereof for insertion into said hollow calender roll, a second group of tubular heating rods supported by said closure member and arranged along a second complete circle while extending within the cylindrical space defined by said first group of tubular heating rods at one side of said closure member, said first and second circles along which said first and second groups are arranged on said closure member being at least approximately concentric with regard to each other, terminal means respectively connected to said tubular heating rods of said first and second groups and arranged on the other side of said closure member, and collector means connected to said terminal means and supported by said closure member.

2. A heating register according to claim 1, in which the tubular heating rods of said second group are staggered with regard to the tubular heating rods of said first group.

3. A heating register according to claim 1, in which said heating rods of both groups have heating coils thereon connected to said terminal means, and in which said heating coils are distributed differently over the tubular heating rods of said first and second groups respectively for heating different areas of said first and second groups respectively of said heating rods.

4. A heating register according to claim 3, in which said heating coils are spaced from said terminal means sufficiently to prevent any material heating of the latter.

5. A heating register according to claim 1, in which said two groups of heating rods are heatable individually and independently of each other.

References Cited

UNITED STATES PATENTS

| | | | |
|---|---|---|---|
| 3,027,285 | 3/1962 | Eisner et al. | 219—470 X |
| 3,217,137 | 11/1965 | Weitzner | 219—244 X |
| 3,278,723 | 10/1966 | Van Toorn | 219—470 |
| 3,310,655 | 3/1967 | Hager | 219—471 X |

RICHARD M. WOOD, *Primary Examiner.*

L. H. BENDER, *Assistant Examiner.*